United States Patent
Cho et al.

(10) Patent No.: US 10,451,649 B2
(45) Date of Patent: Oct. 22, 2019

(54) MOTION SENSOR WITH AUTOMATICALLY ADJUSTABLE SENSITIVITY

(71) Applicant: Eaton Intelligent Power Limited, Dublin (IE)

(72) Inventors: Nam Chin Cho, Peachtree City, GA (US); James Richard Christ, Peachtree City, GA (US); Tyler Christian Johnston, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 16/212,457

(22) Filed: Dec. 6, 2018

(65) Prior Publication Data

US 2019/0107551 A1 Apr. 11, 2019

Related U.S. Application Data

(63) Continuation of application No. 15/616,796, filed on Jun. 7, 2017, now Pat. No. 10,156,581.

(60) Provisional application No. 62/348,305, filed on Jun. 10, 2016.

(51) Int. Cl.
| | |
|---|---|
| *G01P 13/00* | (2006.01) |
| *G08B 29/24* | (2006.01) |
| *G01P 21/00* | (2006.01) |
| *H05B 37/02* | (2006.01) |
| *G08B 29/20* | (2006.01) |
| *G08B 13/19* | (2006.01) |

(52) U.S. Cl.
CPC .............. *G01P 13/00* (2013.01); *G01P 21/00* (2013.01); *G08B 29/24* (2013.01); *H05B 37/0227* (2013.01); *G08B 13/19* (2013.01); *G08B 29/20* (2013.01)

(58) Field of Classification Search
CPC .......... G01P 13/00; G01P 15/02; G01P 21/00; G08B 29/20; G08B 13/19; G08B 29/24; H05B 37/0227
See application file for complete search history.

(56) References Cited

U.S. PATENT DOCUMENTS

| | | | |
|---|---|---|---|
| 9,871,959 B1 * | 1/2018 | Hlatky | ............... H04N 5/23206 |
| 2005/0128067 A1 | 6/2005 | Zakrewski | |
| 2013/0182107 A1 | 7/2013 | Anderson | |

* cited by examiner

*Primary Examiner* — David P Porta
(74) *Attorney, Agent, or Firm* — King & Spalding LLP

(57) ABSTRACT

A motion sensor includes a sensor element to sense a motion, and a controller communicably coupled to the sensor element. The controller is configured to set a detection sensitivity of the motion sensor to a maximum setting of the detection sensitivity. The controller is further configured to decrease the detection sensitivity of the motion sensor upon a detection of the motion until the motion is undetectable by the motion sensor at a decreased setting of the detection sensitivity. The controller is further configured to increase the detection sensitivity of the motion sensor until the motion sensor detects the motion at an increased setting of the detection sensitivity and to set the detection sensitivity of the motion sensor to a new setting based on the increased setting.

20 Claims, 6 Drawing Sheets

MOTION SENSOR WITH AUTOMATICALLY ADJUSTABLE SENSITIVITY

RELATED APPLICATIONS

The present application is a continuation application of and claims priority to U.S. patent application Ser. No. 15/616,796, filed Jun. 7, 2017, and titled "Motion Sensor With Automatically Adjustable Sensitivity," which claims priority under 35 U.S.C. § 119(e) to U.S. Provisional Patent Application No. 62/348,305, filed Jun. 10, 2016, and titled "Motion Sensor With Automatically Adjustable Sensitivity." The entire contents of the preceding applications are incorporated herein by reference.

TECHNICAL FIELD

The present disclosure relates generally to motion sensors, and more particularly to motion sensors with automatically adjustable detection sensitivity.

BACKGROUND

Motion sensors are commonly used in outdoor security lighting. For example, a motion sensor may be used to illuminate an area based on motion indication signals received within the motion sensor's sensing zone. The range of the motion detection of a motion sensor (e.g., the distance from the motion sensor that an object can be detected) is typically adjusted via a control input (e.g., switch or knob) located on the motion sensor housing. A user may want to set/adjust the detection range of a motion sensor for a number of reasons. For example, a user may not want people that are beyond the user's property line to trigger the motion sensor. As another example, a user may want to avoid triggering the motion sensor when the user is beyond a certain distance from the motion sensor. However, because motion sensors are not typically installed within easy reach, manually adjusting the control input may be challenging. Further, setting/adjusting the range of motion detection to a desired range is an iterative process of manually adjusting the detection sensitivity of the motion sensor and testing the detection range by walking at the desired range limit until the range of motion detection is set to the desired range. Such an iterative process can be time-consuming and carries an increased risk of injury to the user when repeatedly attempting to reach the motion sensor.

In some cases, adjusting the range of motion detection to a desired range may not be adequate to avoid motion detection. For example, even after limiting the detection range with respect to distance from the motion sensor, the motion sensor may still detect motion caused by a person (e.g., a neighbor) that is on a side of the motion sensor. To limit such angular motion detection, a blinder and other structures are often attached to the motion sensor or in the vicinity of the motion sensor to block a line of sight to the motion sensor. Such solutions can result in additional cost and installation efforts and may not always be aesthetically desirable.

Thus, a solution that enables easy adjustment of the range of detection (i.e., distance and/or angular range) is desirable.

SUMMARY

The present disclosure relates generally to motion sensors, and more particularly to motion sensors with automatically adjustable detection sensitivity. In an example embodiment, a motion sensor includes a sensor element to sense a motion, and a controller communicably coupled to the sensor element. The controller is configured to set a detection sensitivity of the motion sensor to a maximum setting of the detection sensitivity. The controller is further configured to decrease the detection sensitivity of the motion sensor upon a detection of the motion until the motion is undetectable by the motion sensor at a decreased setting of the detection sensitivity. The controller is further configured to increase the detection sensitivity of the motion sensor until the motion sensor detects the motion at an increased setting of the detection sensitivity and to set the detection sensitivity of the motion sensor to a new setting based on the increased setting.

In another example embodiment, a motion sensor includes a first sensor element to sense a first motion in a first area, and a second sensor element to sense a second motion in a second area. The motion sensor further includes a controller configured to set a first detection sensitivity of the motion sensor with respect to the first sensor element to a maximum setting, and to decrease, upon a detection of the first motion, the first detection sensitivity of the motion sensor with respect to the first sensor element until the first motion is undetectable by the motion sensor. The controller is further configured to increase the first detection sensitivity of the motion sensor with respect to the first sensor element until the motion sensor detects the first motion at an increased setting and to set the first detection sensitivity of the motion sensor with respect to the first sensor element to a new setting based on the increased setting. The new setting is different from a setting of a second detection sensitivity of the motion sensor with respect to the second sensor element.

In another example embodiment, a method of adjusting sensitivity of a motion sensor includes setting, by a controller, a detection sensitivity of the motion sensor to a maximum setting, where the motion sensor detects a motion at the maximum setting. The method further includes decreasing, by the controller, the detection sensitivity of the motion sensor until the motion is undetectable by the motion sensor, and increasing, by the controller, the detection sensitivity of the motion sensor until the motion sensor detects the motion at an increased setting. The method also includes setting, by the controller, the detection sensitivity of the motion sensor to a new setting, wherein the new setting is determined based on the increased setting.

These and other aspects, objects, features, and embodiments will be apparent from the following description and the claims.

BRIEF DESCRIPTION OF THE FIGURES

Reference will now be made to the accompanying drawings, which are not necessarily drawn to scale, and wherein.

Figure 1:
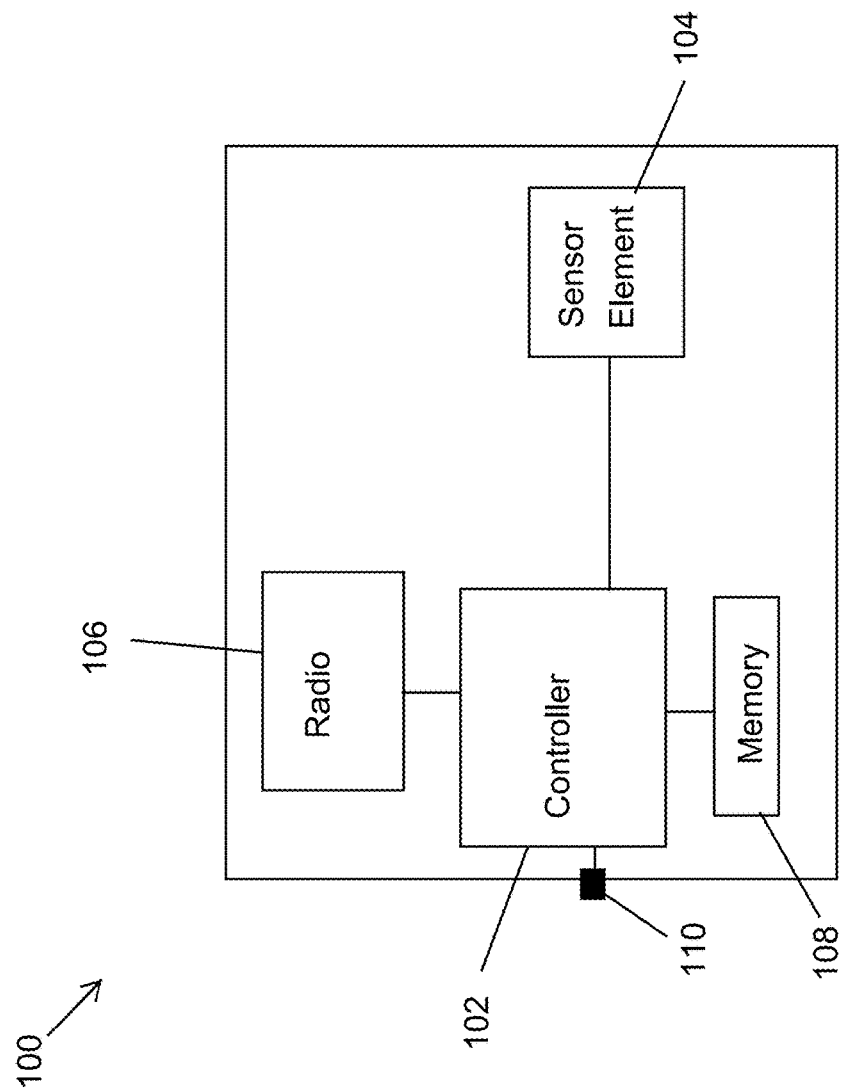
FIG. 1 illustrates a motion sensor with automatically adjustable detection sensitivity according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

In some example embodiments, a motion sensor with automatic sensitivity adjustment capability may set/adjust its motion detection sensitivity to sense motion within a desired distance limit automatically, i.e., without requiring an iterative sensitivity adjustment by a user. For example, a motion sensor with automatic sensitivity adjustment capability may enter a programming mode (e.g., a range setting mode) in response to a user input to set/adjust the sensitivity of motion detection of the motion sensor. The user input may be provided to the motion sensor wirelessly, for example, from a mobile device, or manually via a user interface (e.g., a control button) of the motion sensor. After providing the user input to the motion sensor, the user may start moving along the outer boundary of the desired detection range from the motion sensor. Upon entering the programming mode in response to the user input, the motion sensor may set its motion detection sensitivity to maximum sensitivity to detect the user's motion. After detecting the user's motion and while the user keeps moving along the desired detection range limit, the motion sensor keeps adjusting the sensitivity down until the user's motion is no longer detected by the motion sensor. When the motion detector no longer detects user's motion after reducing its detection sensitivity, the motion sensor starts increasing its detection sensitivity until the user's motion is again detected. The sensitivity level at which the motion sensor detects the user's motion after increasing its sensitivity may be set as the sensitivity level of the motion detection for normal operations. Alternatively, the sensitivity level at which the motion sensor detects the user's motion after increasing its sensitivity may be used to determine/set the sensitivity level for normal operation of the motion sensor, for example, by adding sensitivity margins.

In some example embodiments, the motion sensor may include two or more sensor elements with some overlapping and some non-overlapping sensing zones/areas with respect to each other. In such cases, the user may desire to set the detection sensitivity of the motion sensor to different levels with respect different sensor elements. To illustrate, a user may provide an input to the motion sensor to cause the motion sensor to enter a programming mode (e.g., angular range programming mode). To set/adjust the detection sensitivity of the motion sensor with respect to a particular sensor element, after providing the user input to the motion sensor to enter the programming mode, the user may move along a desired detection range limit within or at the boundary of a non-overlapping sensing zone/area of the particular sensor element. The motion sensor may set/adjust the sensitivity level with respect to the particular sensor element by decreasing and increasing the sensitivity of the motion detector in a similar manner as described above with respect to the setting/adjustment of the overall sensitivity level of the motion sensor. The detection sensitivity level of the motion detection with respect to other sensor elements of the motion detector may be set/adjusted in a similar manner if desired. The detection sensitivity level of the motion detector with respect to a particular sensor element may be set/adjusted before or after the overall detection sensitivity level of the motion sensor is set/adjusted as described above.

Turning now to the drawings, particular example embodiments are described. FIG. 1 illustrates a motion sensor 100 with automatically adjustable detection sensitivity according to an example embodiment. For example, the motion sensor 100 allows a user to set the limit of a detection range of the motion sensor 100 at a desired general distance from the motion sensor 100 without the user having to iteratively adjust the sensitivity of the motion sensor 100. In some example embodiments, the motion sensor 100 includes a controller 102 and a sensor element 104. The sensor element 104 is designed to sense a motion of a moving entity. To illustrate, the sensor element 104 may receive infrared signals indicating a motion, such as a person's motion. A signal that indicates a motion may also be a reflected signal resulting from a reflection of a transmitted signal that is transmitted, for example, by the motion sensor 100.

In some example embodiments, the controller 102 is communicably coupled to the sensor element 104. For example, the controller 102 may receive an electrical signal from the sensor element 104 that indicates the sensing of a motion by the sensor element 104 within a sensing zone of the sensor element 104. To illustrate, the sensor element 104 may receive a motion indication signal (e.g., an infrared signal), generate an electrical signal from the motion indication signal and provide the electrical signal to controller 102. The controller 102 may include an analog-to-digital converter that converts the electrical signal to a digital signal for processing by the controller 102. For example, the controller 102 may include a microcontroller or a microprocessor that processes the digital signal. Alternatively or in addition to the electrical signal generated from the motion indication signal received by the sensor element 104, the sensor element 104 may provide one or more other signals to the controller 102 indicating sensing status and other information related to the sensor element 104.

In some example embodiments, the motion sensor 100 may also include a radio component (e.g., a wireless transceiver) 106. The motion sensor 100 may transmit and receive wireless communication signals using the radio component 106. For example, the radio component 106 may be communicably coupled to the controller 102, allowing the controller 102 to communicate with, for example, a mobile device. A user may use an application resident on a mobile device or another type of wireless device to instruct the motion sensor 100 to enter into a programming mode (e.g., a range setting mode) by wirelessly communicating with the controller 102 through the radio component 106. As another example, the controller 102 may wirelessly communicate with a wireless device to indicate that the motion sensor 100 (thus, the controller 102) has entered a programming mode, has exited the programming mode, to send/receive information related to the sensitivity setting of the motion sensor 100, etc.

In some example embodiments, the motion sensor 100 includes a memory device (e.g., an SRAM) that is used to store software executable by the controller 102 and data used by and/or stored by the controller 102 during operations of the motion sensor 100. For example, the controller 102 may execute code stored in the memory device 108 to communicate wirelessly and to determine whether an electrical signal from the sensor element 104 indicates a motion within the sensing zone of the motion sensor 100. Information such as sensing status information, detection sensitivity setting, etc. may also be stored in the memory device 108.

In some example embodiments, the motion sensor 100 includes a user interface 110 (e.g., a knob, a button, a toggle switch, etc.). For example, a user may use the user interface 110 to provide an input to the controller 102 to enter a programming mode. As another example, the user interface 110 may provide an alternative or back-up means for manual adjustment of the detection sensitivity of the motion sensor 100.

After a user indicates to the motion sensor 100 to enter the range setting programming mode, for example, using the user interface 110 or wirelessly from an application on a mobile device, the controller 102 may set a detection sensitivity of the motion sensor 102 to a maximum setting of the detection sensitivity of the motion sensor 100. For example, the controller 102 may adjust the sensitivity of the motion sensor 100 by adjusting the gain of the sensor element 104 or that of another component. In some example embodiments, the motion sensor 100 may be set to a maximum sensitivity setting at the time of manufacturing/assembly, and the controller 102 may not need to adjust the sensitivity at initial installation of the motion sensor 100. After the user instructs the motion sensor 100 to enter the range setting programming mode, the user may start moving along an edge (i.e., boundary) of the desired detection range to indicate the desired outer limit of the detection range to the motion sensor 100.

When the user moves at the edge of the desired detection range that is within the maximum detection range of the motion sensor 100 corresponding to the maximum sensitivity setting of the motion sensor 100, the motion sensor 100 can detect the user's motion. After detecting the user's motion at the maximum sensitivity setting of the motion sensor 100, the controller 102 may keep decreasing the detection sensitivity of the motion sensor 100 until the user's motion is undetectable by the motion sensor 100.

To illustrate, while the user continues to move at a desired distance limit from the motion sensor 100, the controller 102 may gradually decrease the detection sensitivity of the motion sensor 100 in fixed or non-fixed sensitivity intervals, where each decrement corresponds to distance decrements (e.g., in feet), until the motion sensor 100 no longer detects the user's motion. Because the decrease in the sensitivity of the motion sensor 100 eventually results in a corresponding decrease in the detection range of the motion sensor 100, the motion sensor 100 may eventually no longer detect the user's motion as the user continues moving along the boundary of the desired detection range that is beyond of the decreased detection range of the motion sensor 100.

After the detection sensitivity of the motion sensor 100 is decreased to a setting at which the motion sensor 100 no longer detects the user's motion, the controller 102 may start increasing the detection sensitivity of the motion sensor 100 back up until the motion sensor 100 again detects the user's motion. During the gradual increase of the detection sensitivity of the motion sensor 100, the controller 102 may perform the increasing of the detection sensitivity at fixed intervals corresponding to fixed distance increments or at non-fixed intervals corresponding to variable distance increments until the sensitivity is increased to a higher sensitivity resulting in the detection of the user's motion.

After determining the particular setting of the detection sensitivity of the motion sensor 100 at which the user's motion is detected during the gradual increase of the detection sensitivity of the motion sensor 100, the detection sensitivity of the motion sensor 100 may be set to a new setting for normal operations of the motion sensor 100. For example, the new setting may be the same as or may be determined based on the particular setting of the detection sensitivity that resulted in the detection of the user's motion during the gradual sensitivity increase. For example, the new setting may be determined based on particular sensitivity setting during the gradual increase in sensitivity and based on the setting at which the user's motion was no longer detected by the motion sensor 100 during the gradual decrease in sensitivity. For example, the new setting may be based on the average of the two settings. The controller 102 may store the new setting in the memory device 108 and exit the programming mode after setting the detection sensitivity of the motion sensor 100 to the new setting.

Upon changing the detection sensitivity of the motion sensor 100 to the new setting, the motion sensor 100 may communicate the new setting to the user, for example, wirelessly via the radio component 106. Alternatively or in addition, the motion sensor 100 may flash a light, turn off a light, turn on a light, etc. to indicate that the detection sensitivity has been set and/or the programming mode is exited. In some example embodiments, the motion sensor 100 may exit the programming mode in response to a user input received via the user interface 110 or wirelessly by the radio component 106.

In some example embodiments, if the motion sensor 100 does not detect a motion during a timeout period following the change of the detection sensitivity to the maximum setting, the controller 102 may exit the programming mode. Upon the controller 102 exiting the programming mode at the end of the timeout period, the controller 102 may leave the detection sensitivity at the maximum setting, at the setting prior to entering the programming mode, or at another setting.

In some alternative embodiments, upon entering the programming mode, the controller 102 may set the detection sensitivity of the motion sensor 100 at a minimum setting instead of the maximum setting and gradually increase the detection sensitivity until the user's motion is detected at the increased setting. For example, if the desired detection range (i.e., the desired detection sensitivity) of the motion sensor 100 is significantly smaller than the maximum detection range of the motion sensor 100, in some example embodiments, setting the detection sensitivity of the motion sensor 100 at the minimum setting and gradually incrementing the sensitivity until the user's motion is detected may result in relatively faster adjustment of the detection sensitivity of the motion sensor 100.

The motion sensor 100 enables the setting of the detection sensitivity of the motion sensor 100 without requiring the user to repeatedly adjust the sensitivity setting of the motion sensor 100 manually. Because the detection sensitivity of the motion sensor 100 is set based on the outer boundary of the desired detection range indicated by the user, the detection sensitivity matches the user's preference and is set without requiring the user to check for motion detection after each manual adjustment of the setting.

Although one sensor element is shown in FIG. 1, in alternative embodiments, the motion sensor 100 may include more than one sensor element 104. For example, setting the detection sensitivity of the motion sensor 100 may include setting the sensitivity of the motion sensor 100 regardless of whether the sensor element 104 or another sensor element of the motion sensor 100 receives a motion indication signal that indicates a motion within a detection range of the motion sensor 100. In some alternative embodiments, the radio component 106 or the user interface 110 may be omitted without departing from the scope of this disclosure. In some alternative embodiments, some of the components of the motion sensor 100 may be integrated in a single component without departing from the scope of this disclosure.

Figure 2:
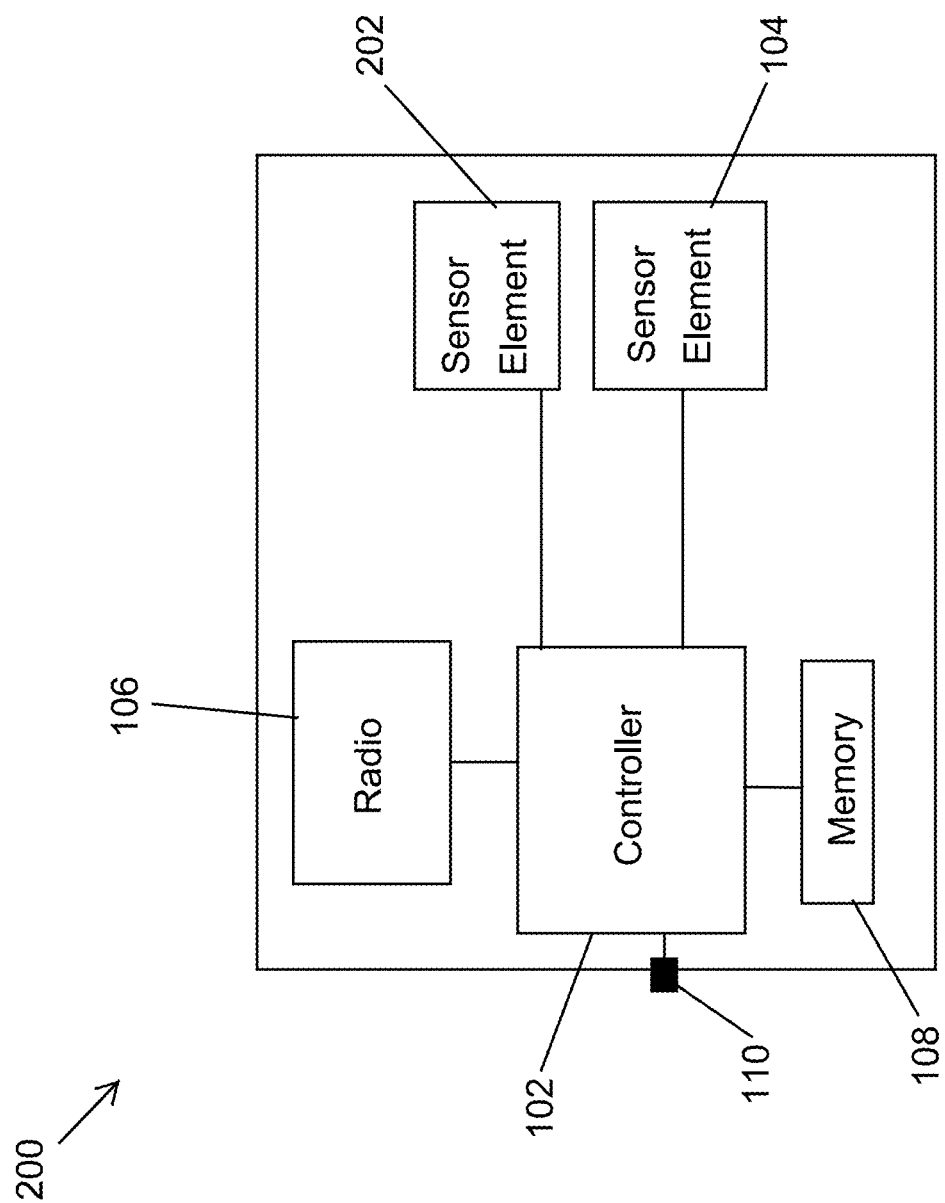
FIG. 2 illustrates a motion sensor with automatically adjustable detection sensitivity according to another example embodiment.

FIG. 2 illustrates a motion sensor 200 with automatically adjustable detection sensitivity according to another example embodiment. The motion sensor 200 may include the controller 102, the sensor element 104, the radio component 106, the memory device 108, and the user interface 110 described above with respect to the motion sensor 100 shown in FIG. 1. In some example embodiments, the motion sensor 200 may also include a sensor element 202. The controller 102 is communicably coupled to the sensor element 104 and to the sensor element 202. The sensor element 202 operates in a similar manner as described above with respect to sensor element 104.

In some example embodiments, the sensor element 104 and the sensor element 202 may have different sensing zones. For example, the sensor elements 104, 202 may have non-overlapping sensing zones/areas, where a signal indicating a motion in one sensing zone/area is received by the sensor element 104 but not the sensor element 202, and where a signal indicating a motion in another sensing zone/area is received by the sensor element 202 but not the sensor element 104. The sensor elements 104, 202 may also have an overlapping sensing zone/area, where both sensor elements 104, 202 may receive a signal indicating a motion within the overlapping sensing zone/area. As a non-limiting example, with respect to the motion sensor 100, the sensor element 104 may be targeted toward a left quadrant area, and the sensor element 200 may be targeted toward a right quadrant area.

In some example embodiments, the detection sensitivity of the motion sensor 200 may be set as described above with respect to the motion sensor 100 based on motion indication signals (e.g., infrared signals) received by either the sensor element 104, the sensor element 202, or both. For example, all of the steps performed by the controller 102 to set/adjust the detection sensitivity of the motion sensor 100 as described above with respect to FIG. 1 may be performed based on motion indication signals received by the sensor element 104 or by the sensor element 202. Alternatively, some of the steps described above with respect to FIG. 1 may be performed based on motion indication signals received by the sensor element 104 and other steps may be performed based on motion indication signals received by the sensor element 202.

To illustrate, as described above with respect to motion sensor 100, during the programming mode, the controller 102 may gradually decrease the detection sensitivity of the motion sensor 200 from the maximum sensitivity until the user's motion is no longer detected, and gradually increase the detection sensitivity back up until the user's motion is detected. The controller 102 may perform the gradual decrease of the detection sensitivity based on based on signals (e.g., infrared signals) received by the sensor element 104, and the controller 102 may perform the gradual increase of the detection sensitivity based on signals (e.g., infrared signals) received by the sensor element 202. The sensitivity setting of the motion sensor 200 resulting from the performance of the sensitivity adjustment performed by the controller 102 may be applied to both the sensor element 104 and the sensor element 202. As a non-limiting example, both sensor elements 104, 202 may detect motions within a maximum radial distance of 20 feet from the motion sensor 100 within some angular boundaries.

In some example embodiments, the detection sensitivity of the motion sensor 200 with respect to the sensor element 104 may be different from the detection sensitivity of the motion sensor 200 with respect to the sensor element 202. For example, the controller 102 may perform detection sensitivity adjustment of the motion sensor 200 with respect to each sensor element separately. To illustrate, a user may provide an input to the motion sensor 200 that the motion sensor 200 should enter a programming mode (e.g., an angular range programming mode) to perform detection sensitivity adjustment of the motion sensor 200 with respect to just one of the sensor elements 104, 202. For example, the user may provide a programming mode selection input to the motion sensor 200 via the user interface 110 or wirelessly from a wireless device to select the angular programming mode, where the controller 102 sets the detection sensitivity of the motion sensor 200 with respect to the sensor element 104.

To set/adjust the sensitivity of the motion sensor 100 with respect to the sensor element 104 based on sensing by the sensor element 104, after entering the angular programming mode, the controller 102 may set the detection sensitivity of the motion sensor 200 with respect to both sensor elements 104, 202 to a maximum setting. To indicate the desired detection range of the motion sensor 200 (e.g., distance from the motion sensor 200) with respect to the sensor element 104, the user may move along the edge/boundary of the desired range limit within the non-overlapping sensing zone/area of the sensor element 104. If motion indication signals received by the sensor element 104 indicate the user's motion after the detection sensitivity is set to the maximum setting, the controller 102 gradually decreases the sensitivity of the motion sensor 100 with respect to the sensor element 104 until the user's motion is no longer detected. The controller 102 may then increase the detection sensitivity of the motion sensor 200 with respect to the sensor element 104 until the user's motion is again detected by the sensor element 104 at an increased detection sensitivity setting of the motion sensor 200. During the angular programming mode, gradually increasing and decreasing the detection sensitivity of the motion sensor 200 may be performed in a similar manner as described above.

After determining the increased detection sensitivity setting at which the user's motion is detected during the gradual increase of the detection sensitivity, the controller 102 may set the detection sensitivity of the motion sensor 200 with respect to the sensor element 104 to a new setting that matches or that is based on the increased detection sensitivity setting as described with respect to motion sensor 100. The new detection sensitivity setting of the motion sensor 200 with respect to the sensor element 104 may be different from the setting of the detection sensitivity of the motion sensor 200 with respect to the sensor element 202. Alternatively, the detection sensitivity of the motion sensor 200 with respect to the sensor element 202 may be set to be the same setting as the detection sensitivity of the motion sensor 200 with respect to the sensor element 104. During the angular programming mode, gradually increasing and decreasing the detection sensitivity of the motion sensor 200 may be performed in a similar manner as described above. The controller 102 may set the detection sensitivity of the motion sensor 200 with respect to the sensor element 202 based on sensing by the sensor element 202 in a similar manner as described with respect to the sensor element 104.

In some example embodiments, if a user wants to change the detection sensitivity of the motion sensor 200 with respect to the sensor element 104 based on sensing by the sensor element 104 but not by the sensor element 202 or vice versa, the motion sensor 200 may provide an indication if a motion is detected by both the sensor elements 104, 202. For example, during the angular programming mode (e.g., after setting the detection sensitivity to the maximum setting), if motion indication signals received by both the sensor elements 104, 202 indicate a motion, the controller 102 may indicate such a condition to the user, which may be a result of the user moving in the overlapping sensing zone/area of the sensor elements 104, 202. For example, the controller 102 may send a message wirelessly to the user's mobile device, flash a light, and/or produce a sound to indicate motion detection by both sensor elements 104, 202. In response, the user may move to the non-overlapping sensing zone/area of the sensor element 104 or that of the sensor element 202. In some example embodiments, upon detecting such a condition, the controller 102 may restart the process of setting/adjusting the detection sensitivity of the motion sensor 100.

In some example embodiments, the adjustment of the detection sensitivity of the motion sensor 200 with respect to just the sensor element 104 or with respect to just the sensor element 202 may be performed after the overall adjustment of the detection sensitivity of the motion sensor 200 based on both sensor elements 104, 202 is performed. Alternatively, the adjustment of the detection sensitivity of the motion sensor 200 with respect to both sensor elements 104, 202 may be performed after the detection sensitivity is adjusted with respect to one sensor element of the motion sensor 200. Upon adjusting the detection sensitivity of the motion sensor 200 as described above, the motion sensor 200 may communicate the new setting to the user and may also indicate that the exit from the programming mode in a similar manner as described above.

By adjusting the detection sensitivity of the motion sensor 200 such that the detection range with respect to one sensor element is different from the detection range with respect to another sensor element, use of physical structures, such as blinders, that are customarily used to limit the angular detection range of a motion sensor may be avoided. By performing the detection sensitivity adjustment of the motion sensor 200 as described above, the motion sensor 200 can save time and can reduce risks associated with repeatedly climbing a ladder to reach a motion sensor to perform manual sensitivity adjustment.

Although two sensor elements are shown in FIG. 2, in alternative embodiments, the motion sensor 200 may include more than two sensor elements without departing from the scope of this disclosure. In some alternative embodiments, the radio component 106 or the user interface 110 may be omitted without departing from the scope of this disclosure. In some alternative embodiments, some of the components of the motion sensor 100 may be integrated in a single component without departing from the scope of this disclosure.

Figure 3:
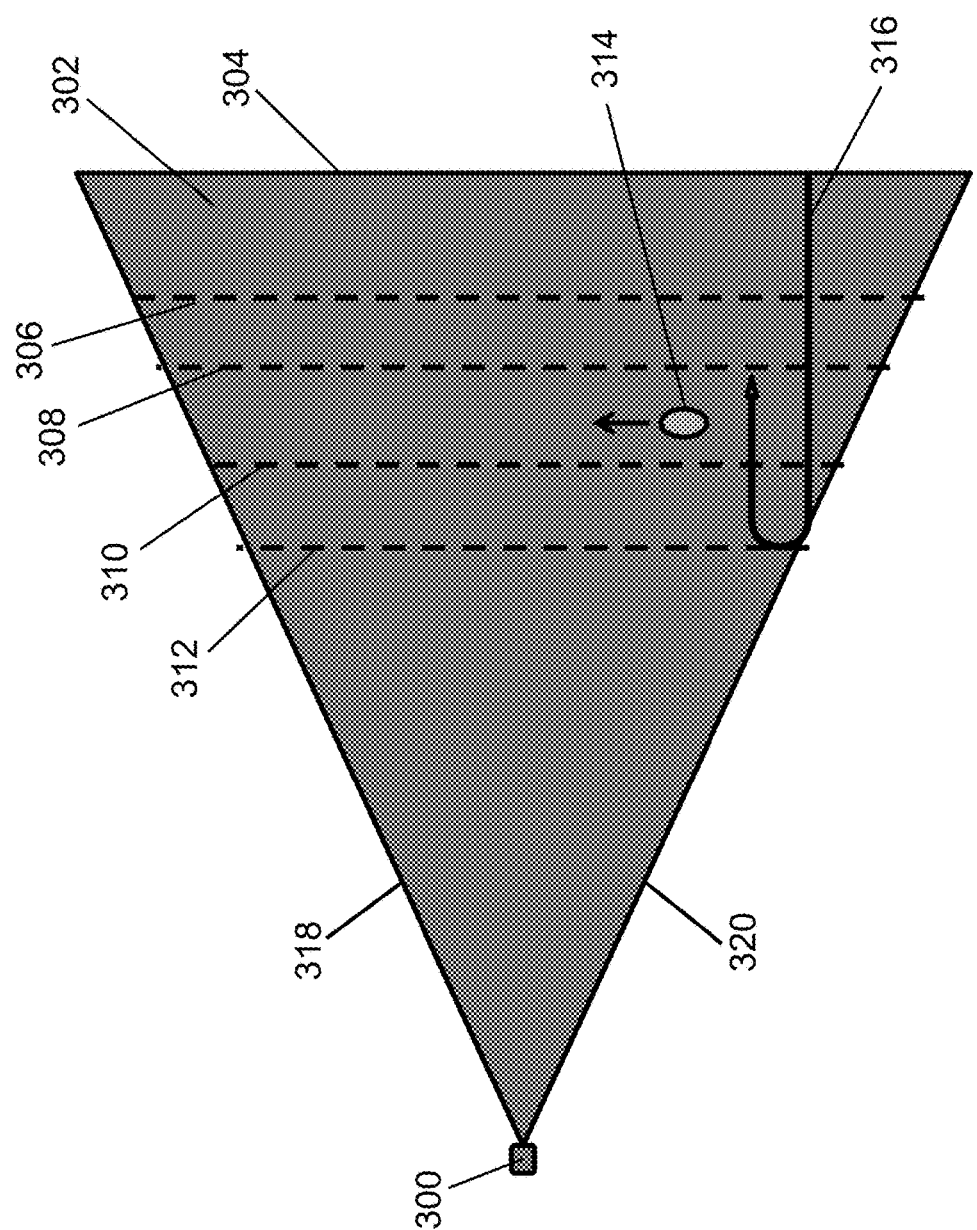
FIG. 3 illustrates detection sensitivity adjustment of a motion sensor according to an example embodiment.

FIG. 3 illustrates detection sensitivity adjustment of a motion sensor 300 according to an example embodiment. For example, the motion sensor 300 may be the motion sensor 100 of FIG. 1, the motion sensor 200 of FIG. 2, or another motion sensor that is similar to the motion sensors 100, 200. For example, the motion sensor 300 may include the controller 102, one or more of the sensor elements 104, 202, etc. shown in FIGS. 1 and 2.

Referring to FIGS. 1-3, the motion sensor 300 may have an illustrative motion detection zone 302 corresponding to a maximum detection sensitivity setting of the motion sensor 300. For example, the motion detection zone 302 may be bound by the detection range limit 304 and angular boundary lines 318, 320. Detection range limits 304-312 indicate example distance edges/boundaries of detection zones based on different settings of the detection sensitivity of the motion sensor 300. For example, when a user 314 moves in the direction shown in FIG. 2 between the detection range limits 308 and 310, the motion of the user 314 may be detected by the motion sensor 300 if the detection sensitivity of the motion sensor 100 is set to correspond to the range limits 304, 306, or 308, but the motion may be undetected if the detection sensitivity of the motion sensor 100 corresponds to the range limits 310 or 312.

To illustrate, after the motion sensor 300 enters the range setting programming mode and sets its detection sensitivity at the maximum setting as described above with respect to the motion sensors 100, 200, the user 314 may walk at a boundary of the desired maximum detection range. A bending arrow 316 illustratively shows the directions of the gradual sensitivity decreasing and increasing steps performed by the controller 102 during the programming mode of the motion sensor 300. For example, the desired maximum detection range may be between the range limits 308 and 310 as shown in FIG. 3. Because the detection sensitivity of the motion sensor 300 is set to maximum sensitivity corresponding to the range limit 304, the motion sensor 300 can detect the user's motion as the user 314 walks between the range limits 308 and 310. After detecting the user's motion, the controller 102 may gradually decrease the detection sensitivity until the user's motion is undetected. For example, the controller 102 may gradually decrease the detection sensitivity until it corresponds to the range limit 310. Alternatively, the controller 102 continue to reduce the detection sensitivity of the motion sensor 300 even after the user's motion is no longer detected, for example, until the detection sensitivity reaches the minimum sensitivity setting of the motion sensor 300. The controller 102 then gradually increases the sensitivity back up until the motion sensor 300 again detects the motion of the user 314, for example, at the increased sensitivity setting that corresponds to the range limit 308.

After the motion of the user 314 is detected at the detection sensitivity setting corresponding to the range limit 308, the setting of the detection sensitivity of the motion sensor 300 for normal operations may be changed to correspond to, for example, the range limit 308, to the range limit 320, to a range limit that is computed based the settings corresponding to the range limits 308 and 310, or to another setting that is based on the range limit 308.

Although the detection range limit is shown by the location of the user 314 to be between the range limits 308 and 310, in alternative embodiments, the user 314 may be closer to or farther from the motion sensor 100 than shown to indicate a different outer limit of a desired detection range. Further, the range limits may be closer or farther apart than shown and may also be curved without departing from the scope of this disclosure. In some alternative embodiments, the shape of the motion detection zone 302 may be different from that shown in FIG. 3 without departing from the scope of this disclosure. In some alternative embodiments, different detection sensitivity settings of the motion sensor 300 may correspond to more or fewer range limits than shown without departing from the scope of this disclosure.

Figure 4:
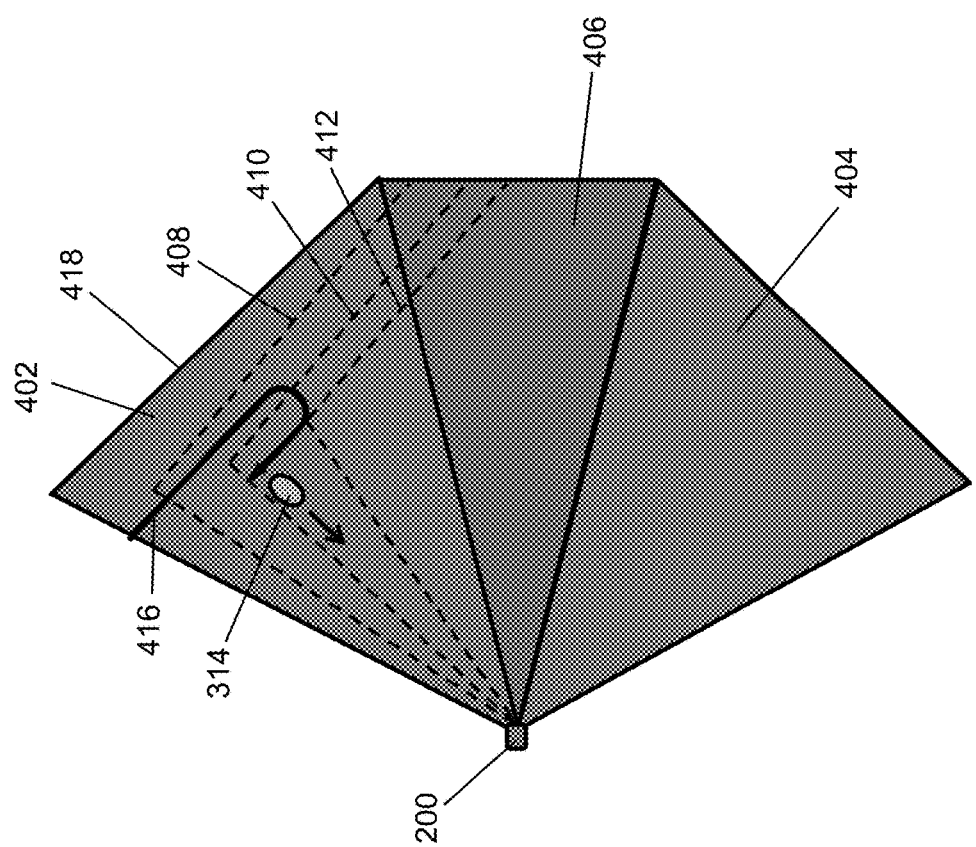
FIG. 4 illustrates detection sensitivity adjustment of the motion sensor of FIG. 2 according to another example embodiment.

FIG. 4 illustrates detection sensitivity adjustment of a motion sensor 200 according to an example embodiment. Referring to FIGS. 2, and 4, the motion sensor 200 may have an illustrative motion detection zone that is a combination of sensor zones 402, 404, 406 at the maximum setting of the detection sensitivity of the motion sensor 200 with respect to both the sensor elements 104, 202. For example, the zone/area 402 may be a non-overlapping sensor zone of the sensor element 104, the zone/area 404 may be a non-overlapping sensor zone of the sensor element 202, and the zone/area 406 may be an overlapping sensor zone of both sensor elements 104, 202. Illustrating with respect to the non-overlapping sensor zone 402, the range limits 408, 410, 412, and 418 correspond to settings of the detection sensitivity of the motion sensor 200 with respect to, for example, the sensor element 104.

To limit the detection sensitivity of the motion sensor 200 with respect to one side of the motion sensor 200 in the non-overlapping sensing zone 402, after the motion sensor 200 enters the angular range programming mode and the controller 102 sets the sensitivity to the maximum setting, the controller 102 may detect the motion of the user 314 as the user 314 moves at the outer boundary of the desired detection range limit. For example, the desired detection range limit may be between the range limits 410 and 412. A bending arrow 416 illustratively shows the directions of the gradual sensitivity decreasing and increasing steps performed by the controller 102 during the programming mode of the motion sensor 200.

The controller 102 may detect the motion of the user 314 based on motion indication signals received via the sensor element 104. In some example embodiments, if the controller 102 detects motion of the user 314 based on motion indication signals received via both sensor elements 104, 202, the controller 102 may indicate so to the user (e.g., flashing a light, sending a wireless signal to the user device, etc.) and may restart the detection sensitivity adjustment process.

After detecting the motion of the user 314 based on motion indication signals received by the sensor element 104 but not by the sensor element 202, the controller 102 may gradually decrease the sensitivity until the user's motion is undetected (or even further, for example, to minimum setting). The controller 102 may then gradually increase the sensitivity back up until the motion sensor 200 detects the motion of the user 314. After the motion of the user 314 is detected at the increased detection sensitivity setting corresponding to the range limit 410, the setting of the detection sensitivity of the motion sensor 200 with respect to the sensor element 104 may be set for normal operations to correspond to, for example, the range limit 410, to the range limit 412, to a range limit that is computed based on the settings corresponding to the range limits 410 and 412, or to another setting that is based on the setting corresponding to the range limit 410.

In some example embodiments, the detection sensitivity of the motion sensor 200 with respect to the non-overlapping sensing zone 404 (and thus, the sensor element 202) may be set in a similar manner instead of or in addition to the setting of the detection sensitivity of the motion sensor 200 with respect to the sensor element 104 described above. In some example embodiments, the detection sensitivity of the motion sensor 200 may be adjusted based on detection by one or both sensor element 104, 202, based on the movement of the user 314 within the overlapping sensing zone 406 to indicate the desired detection range limit.

Although FIG. 4 is described with respect to the motion sensor 200, the description is applicable to embodiments of the motion sensor 100 of FIG. 1 that include more than one sensor element. In some example embodiments, the range limits may be spaced differently than shown without departing from the scope of this disclosure. In some alternative embodiments, the detection sensitivity of the motion sensor 200 may correspond to more or fewer detection range limits than shown without departing from the scope of this disclosure.

Figure 5:
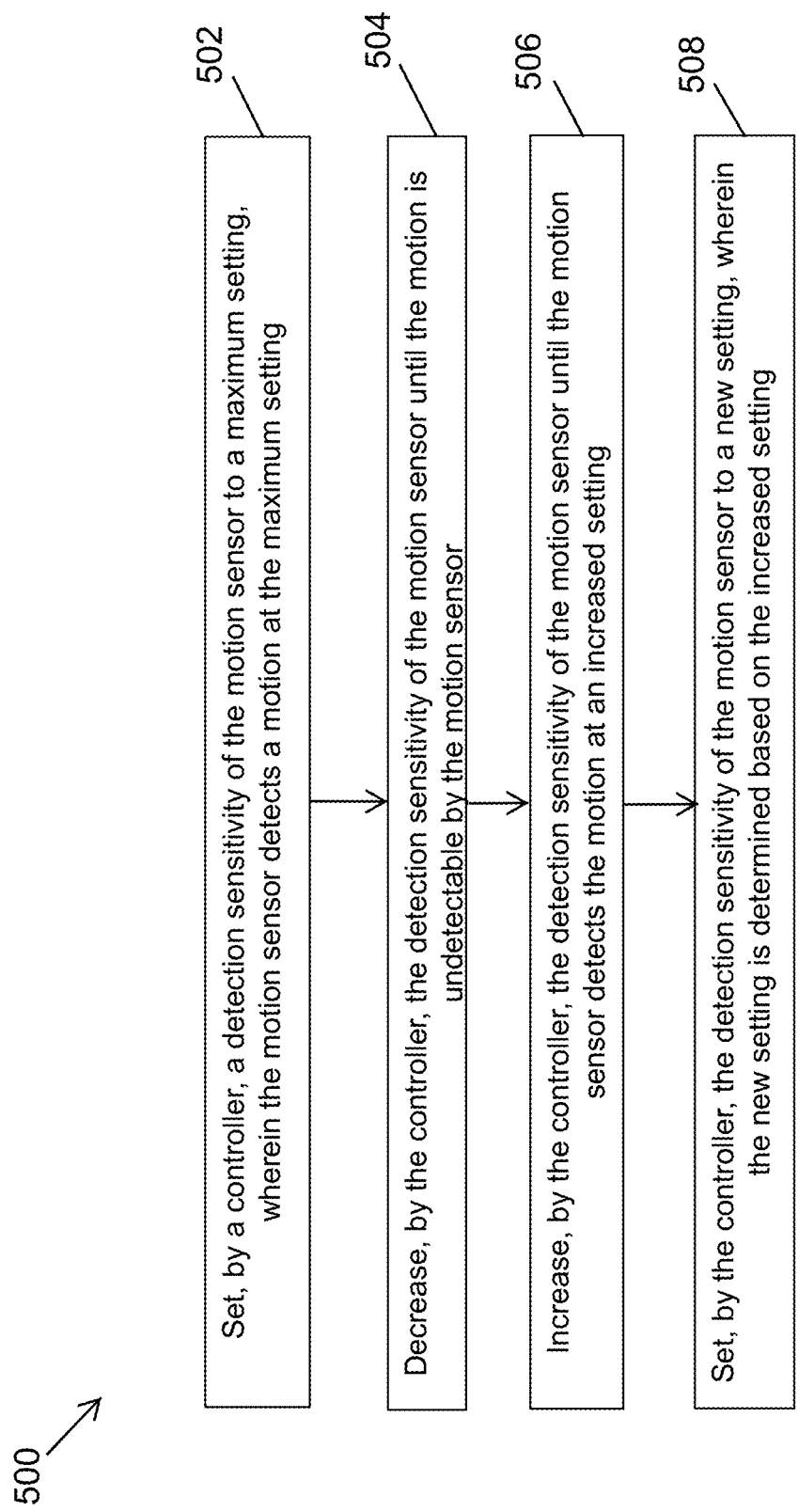
FIG. 5 illustrates a method of automatically adjusting detection sensitivity of the motion sensors of FIGS. 1-3 according to an example embodiment.

FIG. 5 illustrates a method 500 of automatically adjusting detection sensitivity of the motion sensors 100, 200, 300 of FIGS. 1-3 according to an example embodiment. Referring to FIGS. 1-5, in some example embodiments, at step 502, the method 500 includes setting, by the controller 102, a detection sensitivity of the motion sensor 100, 200, 300 to a maximum setting. The motion sensor 100, 200, 300 may detect a motion, for example, of the user 314 at the maximum setting. At step 504, the method 500 includes decreasing, by the controller 102, the detection sensitivity of the motion sensor 100, 200, 300 until the motion is undetectable by the motion sensor 100, 200, 300. At step 506, the method 500 includes increasing, by the controller 102, the detection sensitivity of the motion sensor 100, 200, 300 until the motion sensor 100, 200, 300 detects the motion at an increased setting. At step 508, the method 500 includes setting, by the controller 102, the detection sensitivity of the motion sensor to a new setting, wherein the new setting is determined based on the increased setting.

In some example embodiments, the method 500 may also include entering a programming mode before setting a detection sensitivity of the motion sensor 100, 200, 300 to a maximum setting, for example, in response to a user input provided via the user interface 110 or via wireless communication. As described above, a motion sensor 100, 200, 300 may include two or more sensor elements. Setting the detection sensitivity of the motion sensor 100, 200, 300 to the new setting may include setting the detection sensitivity of the motion sensor with respect to just one sensor element of the motion sensor 100, 200, 300 such that a setting of the detection sensitivity of the motion sensor 100, 200, 300 with respect to the one or more other sensor elements is different from the new setting. Upon setting of the detection sensitivity of the motion sensor to the new setting, the method 500 may include exiting the programming mode and indicating that the detection sensitivity of the motion sensor In some example embodiments, set to the new setting, for example, by sending a message to the user using wireless signals or by other means such as flashing a light.

Figure 6:
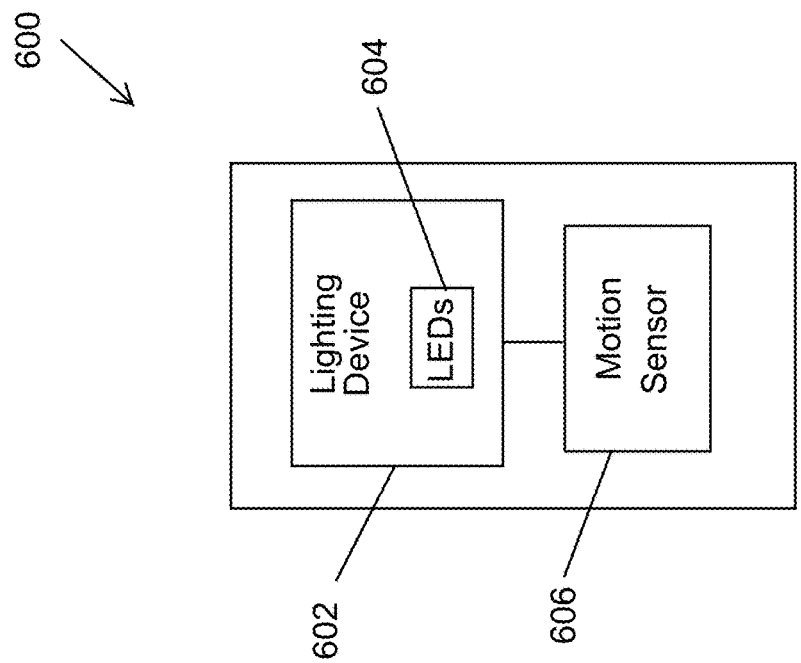
FIG. 6 illustrates a lighting fixture including a motion sensor according to an example embodiment.

FIG. 6 illustrates a lighting fixture 600 including a motion sensor 606 according to an example embodiment. For example, the motion sensor 606 may be the motion sensor 100, the motion sensor 200, the motion sensor 300, or another motion sensor that operates in a similar manner as described above with respect to the motion sensors 100, 200, 300.

In some example embodiments, the lighting fixture 600 may also include a lighting device 602 that is coupled to the motion sensor 606. For example, the lighting device 602 may include a light source 604 (e.g., LED light source) that may be turned on and off based on motion detection by the motion sensor 606. The detection sensitivity of the motion sensor 606 may be adjusted as described above with respect to the motion sensors 100, 200, 300, for example, to limit areas near the lighting fixture 600 where a motion can result in the light source 604 being powered on.

Although the lighting fixture 600 is shown in FIG. 6 as including one motion sensor, in alternative embodiments, the lighting fixture 600 multiple motion sensors without departing from the scope of this disclosure. In some alternative embodiments, the motion sensor 606 may be integrated in the lighting fixture 600 in a different manner or may be external to the lighting fixture 600 without departing from the scope of this disclosure.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A motion sensor, comprising:
a sensor element to sense a motion; and
a controller communicably coupled to the sensor element, wherein the controller is configured to:
  set a detection sensitivity of the motion sensor to a maximum setting of the detection sensitivity;
  decrease the detection sensitivity of the motion sensor, upon a detection of the motion at the maximum setting of the detection sensitivity, until the motion is undetectable by the motion sensor at a decreased setting of the detection sensitivity; and
  set the detection sensitivity of the motion sensor to a new setting after decreasing the detection sensitivity of the motion sensor.

2. The motion sensor of claim 1, further comprising a wireless transceiver communicably coupled to the controller to wirelessly transmit and receive wireless signals.

3. The motion sensor of claim 1, wherein the controller sets the detection sensitivity of the motion sensor to the maximum setting of the detection sensitivity during a programming mode of the motion sensor.

4. The motion sensor of claim 3, wherein the motion sensor enters the programming mode in response to user input received wirelessly by the motion sensor.

5. The motion sensor of claim 3, wherein the motion sensor enters the programming mode in response to a user input received via a user interface of the motion sensor.

6. The motion sensor of claim 3, wherein the motion sensor exits the programming mode if the motion is undetected within a timeout period after the detection sensitivity of the motion sensor is set to the maximum setting of the detection sensitivity.

7. The motion sensor of claim 6, wherein the controller leaves the detection sensitivity of the motion sensor set to the maximum setting of the detection sensitivity when the motion sensor exits the programming mode at an end of the timeout period.

8. The motion sensor of claim 1, wherein the controller is configured to decrease the detection sensitivity of the motion sensor in fixed sensitivity intervals that correspond to fixed distances.

9. The motion sensor of claim 1, wherein the controller is configured to decrease the detection sensitivity of the motion sensor in non-fixed sensitivity intervals that correspond to variable distances.

10. A motion sensor, comprising:
a first sensor element to sense a first motion in a first area;
a second sensor element to sense a second motion in a second area; and
a controller configured to:
  decrease a first detection sensitivity of the motion sensor with respect to the first sensor element until the first motion is undetectable by the motion sensor;
  increase the first detection sensitivity of the motion sensor with respect to the first sensor element after the motion becomes undetectable until the motion sensor detects the first motion at an increased setting; and
  set the first detection sensitivity of the motion sensor with respect to the first sensor element to a new setting based on the increased setting, wherein the new setting is different from a setting of a second detection sensitivity of the motion sensor with respect to the second sensor element.

11. The motion sensor of claim 10, wherein the controller is configured to set the second detection sensitivity of the motion sensor with respect to the second sensor element based on the second motion.

12. The motion sensor of claim 10, wherein the controller is configured to set the first detection sensitivity of the motion sensor with respect to the first sensor element to the new setting during a programming mode of the motion sensor.

13. The motion sensor of claim 12, wherein the controller is configured to indicate to a user if a user's motion is sensed by both the first sensor element and the second sensor element during the programming mode.

14. The motion sensor of claim 12, wherein the motion sensor enters the programming mode in response to a user input received via a user interface of the motion sensor.

15. The motion sensor of claim 12, wherein the motion sensor exits the programming mode in response to a user input received wirelessly by the motion sensor.

16. The motion sensor of claim 10, wherein the controller is configured to set the first detection sensitivity of the motion sensor with respect to the first sensor element and the second detection sensitivity of the motion sensor with respect to the second sensor element based on a third motion sensed in an area that is overlapped by the first area and the second area.

17. A method of adjusting a detection sensitivity of a motion sensor, the method comprising:
decreasing, by a controller, the detection sensitivity of the motion sensor until a motion that is previously detectable by the motion sensor is undetectable by the motion sensor;
increasing, by the controller, the detection sensitivity of the motion sensor after the motion becomes undetectable until the motion sensor detects the motion at an increased setting; and
setting, by the controller, the detection sensitivity of the motion sensor to a new setting, wherein the new setting is determined based on the increased setting.

18. The method of claim 17, further comprising entering a programming mode of the motion sensor in response to a user input prior to setting the detection sensitivity of the motion sensor to the new setting.

19. The method of claim 17, wherein the motion sensor comprises a first sensor element and a second sensor element, wherein the step of setting the detection sensitivity of the motion sensor to the new setting comprises setting the detection sensitivity of the motion sensor with respect to the first sensor element to the new setting, and wherein the detection sensitivity of the motion sensor with respect to the second sensor element is a different setting from the new setting.

20. The method of claim 17, further comprising indicating, by the motion sensor, the setting of the detection sensitivity of the motion sensor to the new setting.

* * * * *